A. L. COOPER.
ADJUSTABLE DRAFT RIGGING FOR TRACTORS.
APPLICATION FILED NOV. 22, 1919.
1,360,502.
Patented Nov. 30, 1920.
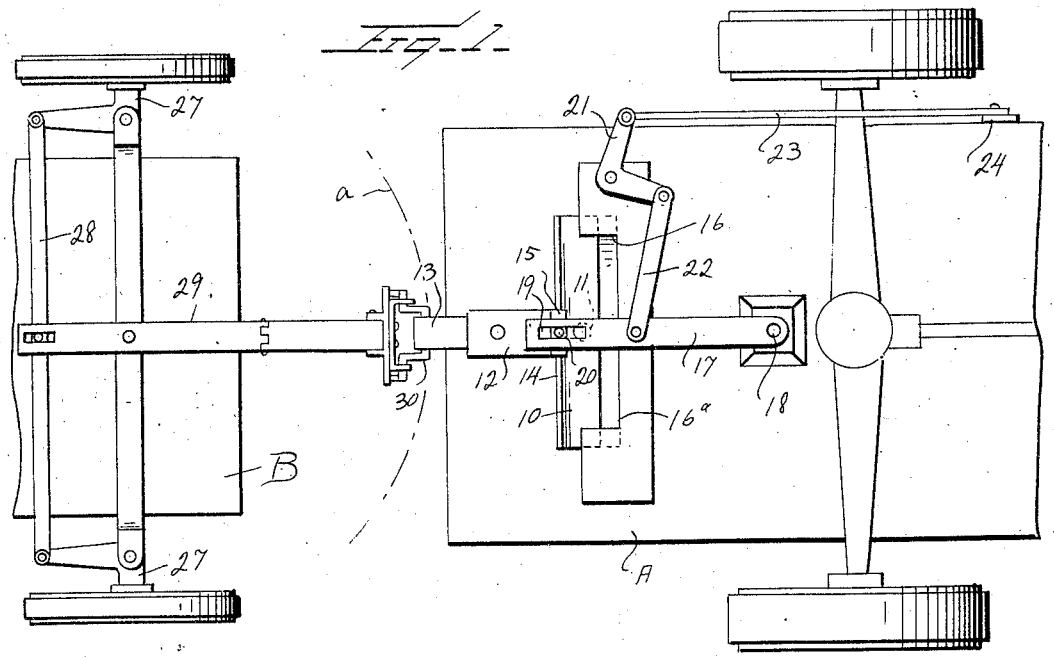
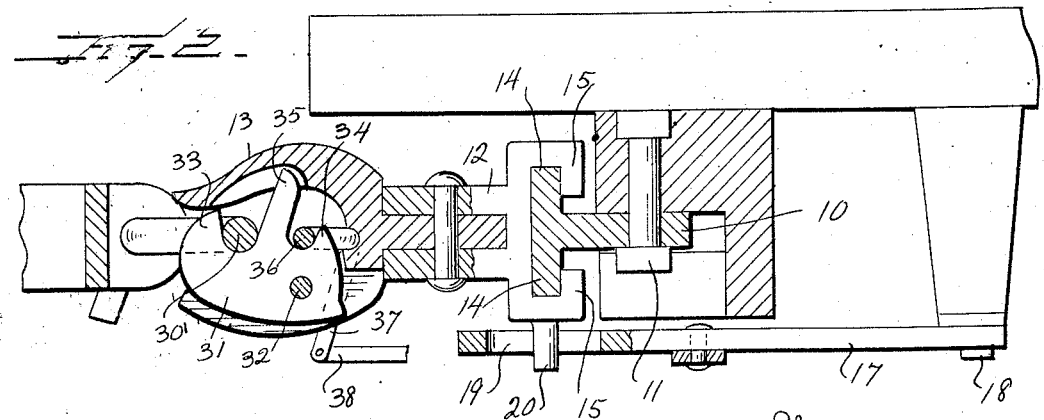
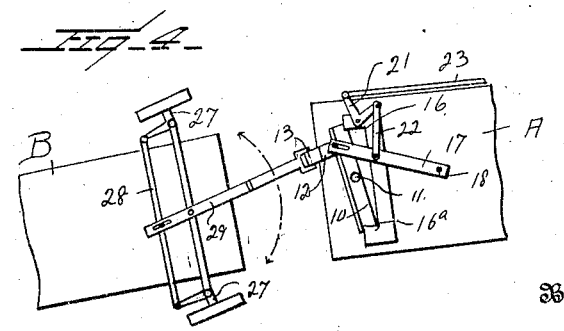
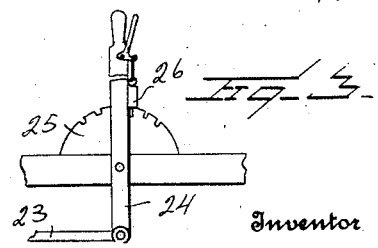
Inventor
A.L. Cooper
By Watson E. Coleman
Attorney

UNITED STATES PATENT OFFICE.

ARTHUR L. COOPER, OF LOS ANGELES, CALIFORNIA.

ADJUSTABLE DRAFT-RIGGING FOR TRACTORS.

1,360,502.   Specification of Letters Patent.   Patented Nov. 30, 1920.

Application filed November 22, 1919. Serial No. 339,928.

*To all whom it may concern:*

Be it known that I, ARTHUR L. COOPER, a citizen of the United States, residing at Los Angeles, in the county of Los Angeles and State of California, have invented certain new and useful Improvements in Adjustable Draft-Rigging for Tractors, of which the following is a specification, reference being had to the accompanying drawings.

This invention relates to draft rigging whereby one vehicle may be coupled to another and particularly to draft rigging designed primarily to be used between a tractor and a trailer, though adapted to be used between any draft vehicle and any vehicle acting as a trailer.

Ordinarily a trailer and tractor are used for heavy hauling and where the trailer, as is usually the case, is provided with forward wheels mounted on knuckles in the usual manner of automobile construction, the services of two men are necessary, one as a driver of the tractor and the other to handle and steer the trailer, for the reason that whenever the tractor and trailer are backed, the rear wheels of the trailer must be manually guided in order that the trailer may be properly controlled, as otherwise it would be impossible by backing the tractor to force the trailer to take the direction desired. The ordinary course of procedure is for the operator of the trailer to get off the trailer and by taking hold of the tongue which is connected to the rear knuckles of the trailer, steer the trailer in its backward course. This is a dangerous procedure and has oftentimes led to injury and loss of life.

Again, where the tractor and trailer are operating over narrow roads having short curves, as for instance operating over mountain roads in the West, it is necessary that the operator of the trailer should get off the trailer and manually shift the tongue to thereby control the front knuckles of the wheels of the trailer in order to prevent the trailer from taking a course which would be liable to land it in a ditch or over the side of the road on these short curves. This also is extremely dangerous and in either case it will be obvious that such a steering of the trailer involves an additional danger to the operator through the fact that irregularities in the road are liable to swing the tongue from side to side and throw the operator off his feet and beneath the wheels of the trailer, or of the tractor if the machines are backing.

As a consequence of the difficulty of backing a tractor and trailer with any certainty as to direction, trailers are not ordinarily backed up to a loading platform as they should be but the tractor and trailer are run into position parallel to the loading platform to be loaded or unloaded and this takes up a great deal of room. The tractor and trailer, as a matter of fact, will require a length of 40' on a loading platform in order that the tractor and trailer may pull into position and pull out. If on the other hand, the tractor could back the trailer into position, trailers and tractors would occupy, when loading and unloading, a much less space parallel to the platform and thus a great economy could be used.

The general object of my invention is to overcome these difficulties by providing means mounted on the tractor whereby the steering tongue and front steering wheels of the trailers may be manually controlled.

A further object in this connection is to provide means of such character that such a control of the steering of the trailer will require but relatively slight force.

A further object, and a most important one, is to provide a mechanism of this character wherein compensation is made for the movement of the trailer's tongue in an arc of a circle and the consequent movement of the extremity of the trailer tongue relatively away from the tractor when the tongue of the trailer is shifted from a medial position. It is the necessity of shortening the distance between the tractor and trailer as the tongue is shifted laterally that has heretofore made trailer steering devices operated from the tractor impracticable.

A further object is to provide means whereby the push or pull strain on the draft mechanism will be divided and borne by the frame of the tractor itself and will not, under any circumstances, come upon the operating mechanism whereby the tongue of the trailer is shifted.

Still another object is to provide a construction of this kind which permits lateral oscillation of the trailer relative to the truck or tractor on straight pulls and permits this lateral oscillation or a relative vertical oscillation of the tractor and trailer without in any way affecting or moving the controlling handle or the controlling mechanism.

Other objects will appear in the course of the following description.

My invention is illustrated in the accompanying drawings, wherein:—

Figure 1 is a fragmentary plan view of a tractor and a trailer engaged with each other by my adjustable draft rigging;

Fig. 2 is a longitudinal sectional view of the draft rigging;

Fig. 3 is a side elevation of the lever for controlling the lateral shifting of the coupling head;

Fig. 4 is an under side diagrammatic view showing the manner in which the draft rigging is swung to swing the steering wheels of the trailer.

Referring to these drawings, it will be seen that my draft rigging comprises a transversely extending bar, designated 10, which as illustrated is T-shaped in cross section, this bar being operatively pivoted to the body of the tractor truck A by means of a pivot bolt or equivalent element 11. Mounted to slide upon this pivoted member or bar 10 is the draw bar 12 which preferably carries upon it a coupler head, designated generally 13. This coupler head is preferably of the form illustrated in my pending application for patent, Serial No. 299,759, filed May 26, 1919. Preferably, as before remarked, the transverse member 10 is T-shaped in cross section so as to provide downwardly and upwardly extending flanges 14, and the inner end of the draw bar 12 is formed with jaws 15 embracing these flanges and having sliding engagement therewith. The member 10 is so supported that abutments 16 and 16ª are formed forward of the ends of the member 10 so that when this member 10 is oscillated in one direction or the other, one extremity of the member 10 will abut against one or the other of the abutments 16 and 16ª.

For the purpose of manually oscillating the draw bar 12, I pivot upon the under side of the car body or any suitable support a lever 17, the pivotal point of this lever being at 18, and the outer end of the lever being provided with a longitudinally extending slot 19, through which a pin 20 on the forward end of the draw bar extends. A bell crank lever 21 is also pivoted upon the car body at any suitable point, and a link 22 connects one end of the bell crank lever to the tongue 17, while from the other end of the bell crank lever extends a rod 23 which, in turn, is pivoted to the lower end of a controlling lever 24 pivotally supported at its middle upon the car and having a handle at its upper end. This controlling lever operates over a rack 25 and is provided with the usual hand grip actuated bolt or latch 26 for holding the lever in any adjusted position by engagement with the rack 25. It will be obvious now that by shifting the hand lever 24, the lever 17 may be manually shifted in one direction or the other, and that when so shifted it will cause the draw bar to move along the pivoted bar 10, the pin or bolt 20, of course, sliding in the slot 19.

The trailer B is of the usual form, that is the wheels of the trailer are mounted upon knuckles 27 having rearwardly extending arms connected by a steering rod 28. A tongue 29 is pivotally mounted upon the trailer and at its rear end is connected to the steering rod 28, while its forward end is adapted to be connected to the draw bar 12, as by engagement with the coupler head 13. I have shown the forward end of the tongue 29 as being provided with a pivoted yoke 30, and I have illustrated the coupler head 13 as having upper and lower jaws and having pivoted to the lower jaw a member 31 which is pivoted upon the lower jaw, at 32, and which is formed with a yoke engaging hook 33 at its rearward end, a latch engaging hook 34 at its other end, and with an upwardly extending lug 35 at its middle. This member 31 is pivoted unequally so that when uncoupled the member 31 immediately drops under the action of gravity to a depending position and then when the yoke 30 is forced into the coupling head, it will strike the lug 35 and force the member 31 to its coupled position, whereupon the latch 36 will drop behind the hook 34, locking the member 31 in its raised or coupling position. The particular form of this coupling head forms no part of my present invention, but it is illustrated for the purpose of showing a complete coupling and draft rigging between the tractor truck and the trailer.

In the operation of this device, assuming that a trailer is coupled to the truck and the tractor is hauling in a straight line, then the hand lever 24 will be so set that the lever 17 will hold the draw bar 12 to a medial position. The pull under these circumstances will be received by the bolt 11 which connects the pivoted member 10 to the truck. Now in taking a curve or turning a corner, the operator, through the lever 24 and the connections before described, shifts the draw bar 12 toward one side or the other of the truck and thus correspondingly shifts the tongue 29 controlling the steering rod 28 of the trailer and correspondingly turns the front wheels of the trailer. If, for instance, the tractor truck turns toward the right, the operator shifts the lever 24 so as to carry the draw bar 12 toward the left of the truck and this will shift the tongue 29 so that the wheels of the trailer will be turned to cause the trailer to follow the truck in making the turn. Of course, the amount to which the draw bar is shifted will depend upon the curve to be taken by the trailer. As the member 10 is shifted, the draft of the trailer will exert a pull upon the draw bar 12 and when the draw bar has passed the center 11 of the member 10, this pull or draft will cause the member 10 to turn until the end opposite the draw bar strikes against the abutment 16 or 16ª as the case may be. Thereafter this pull of the trailer is supported by the bolt 11 and by the abutment 16 or 16ª. This movement of the member 10 is permitted by the slot 19 of lever 17, and it will be noted that no pull need be exerted on this lever, and thus this pull will not tend to impede, to any extent, the movement of the member 17 under the action of the lever 24, and further it will be noted that the mechanism whereby the draw bar is shifted does not take any of the tractive pull of the trailer. Thus, this mechanism may be relatively light and is relatively easy to operate.

Another and most important advantage secured by the use of a sliding draw bar mounted upon a pivoted member 10 is that the tongue 29 of the trailer is pivoted between its ends and as a consequence the forward end of the trailer tongue swings in an arc of a circle, as at a, in Fig. 1. If the draw bar 12 simply shifted transversely of the truck and this draw bar were not mounted upon a pivoted member 10, then if the draw bar 12 were shifted laterally from its middle position, the force exerted to move the draw bar would have to be of sufficient power to pull the trailer toward the truck to compensate for the difference between the distance of the forward end of the tongue 29 and the truck and the tongue 29 in its intermediate position and the distance between this forward end and the truck when the tongue 29 was in an inclined position. In other words, the operator in shifting the draw bar laterally would have to also forcibly pull the trailer up nearer to the truck. By pivoting the member 10, however, compensation is made for this relative rearward movement of the forward end of the tongue 29 on the trailer because as the tongue 29 swings laterally, the member 10 will swing and, therefore, the draw bar will be shifted rearward relative to the truck to the same extent that the forward end of the tongue 29 is shifted rearward relative to the truck. This is illustrated most clearly in Fig. 4.

An advantage of my construction is that it permits lateral movements of the trailer and tractor relative to each other because of the pivotal connection between the transverse bar 10 and the truck body which permits the draw bar 12 to swing laterally, inasmuch as the yoke 30 on the tongue 29 of the trailer has free, vertical movement in the coupler head 13, it is obvious that the tractor and the trailer may have relative free, vertical movements in passing over rough roads.

As illustrated in Fig. 2, and as fully illustrated in my co-pending application before referred to, the latch 36 is pivotally mounted in the coupler head so as to drop downward behind the hook 34 when the tractor and trailer are coupled together. This latch is preferably provided with an arm 37 which is disposed laterally of the trailer and truck so that it may be readily manipulated without the operator going between the truck and trailer, and this arm may be, and preferably is, connected by a rod 38 to operating means on the tractor truck whereby the operator may release the latch 36 to thereby uncouple the trailer. This mechanism forms no part of my present application, but is illustrated to show that by means of the trailer steering mechanism before described and the coupler mechanism, a single tractor driver may have complete control over the trailer without the necessity of leaving his place.

While I have illustrated certain details of construction and definite arrangement of parts, I do not wish to be limited to these details except as specified in the appended claims, as it is obvious that many changes might be made therein without departing from the spirit of the invention.

I claim:—

1. A tractor, a draft member pivoted upon the tractor for limited oscillation in a horizontal plane, a draw bar mounted upon said member for movement transverse to the line of draft, and manually operable means for laterally shifting the draw bar from a middle position.

2. A tractor, a draw bar mounted upon the tractor for simultaneous lateral and rearward bodily movement from a middle position, a coupling member carried on the draw bar, and manually operable means on the tractor for laterally shifting the draw bar.

3. A tractor, a draw bar mounted thereon for lateral and rearward movement from a middle position, manually operable means on the tractor for bodily laterally shifting the draw bar, and means preventing the rearward movement of the draw bar when in its middle position but permitting a gradual rearward movement of the draw bar under the pull of a load when the draw bar is shifted laterally and in proportion to the lateral movement of the draw bar.

4. The combination with a tractor vehicle and a trailer, the latter having a forwardly projecting, pivoted steering tongue, of a draw bar mounted upon the tractor for bodily transverse movement, the draw bar having tractive engagement with the tongue at all times, manually controlled means on the tractor for transversely shifting the draw bar, and means for compensating for the rearward movement of the forward end of the pivoted tongue due to a lateral movement of the draw bar from a middle position, said means permitting the draw bar to move gradually rearward a predetermined distance under the strain of the tongue when shifted in either direction beyond the longitudinal axis of the tractor, the rearward movement of the draw bar increasing in correspondence with its lateral movement away from its middle position.

5. A tractor, a transversely extending member mounted upon the tractor for oscillation in a horizontal plane, a draw bar mounted thereon, and abutments limiting the oscillation of the member and against which portions of said member on opposite sides of its pivotal center engage when the member is oscillating.

6. A tractor, a transversely extending member T-shaped in cross section to provide vertically extending flanges and a horizontal flange, said member being pivoted at the middle of its horizontal flange to the tractor, a draw bar having portions embracing the vertical flanges of the member, said draw bar sliding transversely on the member, manually operable means for holding said draw bar disposed at the middle of said member and in line with the pivotal axis thereof or shifting said bar laterally in either direction, and means limiting the oscillation of said pivoted member.

In testimony whereof I hereunto affix my signature.

ARTHUR L. COOPER.